(12) United States Patent
Lindberg

(10) Patent No.: US 9,170,344 B2
(45) Date of Patent: Oct. 27, 2015

(54) SYSTEM AND METHOD FOR DEPLOYMENT OF SEISMIC DATA RECORDERS

(75) Inventor: Craig Lindberg, League City, TX (US)

(73) Assignee: AUTOSEIS, INC., Missouri City, TX (US)

( * ) Notice: Subject to any disclaimer, the term of this patent is extended or adjusted under 35 U.S.C. 154(b) by 1299 days.

(21) Appl. No.: 12/550,868

(22) Filed: Aug. 31, 2009

(65) Prior Publication Data

US 2011/0051550 A1 Mar. 3, 2011

(51) Int. Cl.
*G01V 1/38* (2006.01)
*G01V 1/16* (2006.01)

(52) U.S. Cl.
CPC .................................... *G01V 1/16* (2013.01)

(58) Field of Classification Search
CPC .......................................................... G01V 1/16
USPC ....................................................... 367/15–20
See application file for complete search history.

(56) References Cited

U.S. PATENT DOCUMENTS

| | | | |
|---|---|---|---|
| 3,972,019 A | 7/1976 | Bassett | |
| 4,281,403 A | 7/1981 | Siems et al. | |
| 4,450,543 A | 5/1984 | Neeley | |
| 4,839,613 A | 6/1989 | Echols et al. | |
| 5,561,640 A | 10/1996 | Maciejewski | |
| 5,847,613 A | 12/1998 | Langlet et al. | |
| 6,024,344 A | 2/2000 | Buckley et al. | |
| 6,081,163 A | 6/2000 | Ujiie et al. | |
| 6,278,823 B1 * | 8/2001 | Goldner et al. | 385/100 |
| 6,584,406 B1 | 6/2003 | Harmon et al. | |
| 6,707,346 B2 | 3/2004 | Tillotson et al. | |
| 6,831,525 B1 | 12/2004 | Beaudin et al. | |
| 7,046,584 B2 | 5/2006 | Sorrells et al. | |
| 7,212,075 B2 | 5/2007 | Young et al. | |
| 7,230,543 B2 | 6/2007 | Minto et al. | |
| 7,660,201 B2 | 2/2010 | Fleure et al. | |
| 8,075,226 B2 * | 12/2011 | Thompson et al. | 405/190 |
| 2002/0193947 A1 | 12/2002 | Chamberlain | |
| 2004/0105341 A1 | 6/2004 | Chamberlain et al. | |
| 2005/0007259 A1 | 1/2005 | Minto et al. | |
| 2005/0007887 A1 | 1/2005 | Sorrells et al. | |
| 2005/0012561 A1 | 1/2005 | Young et al. | |
| 2005/0047275 A1 | 3/2005 | Chamberlain et al. | |
| 2005/0052951 A1 * | 3/2005 | Ray et al. | 367/188 |
| 2005/0122839 A1 | 6/2005 | DiFoggio et al. | |
| 2005/0285645 A1 | 12/2005 | Hall et al. | |
| 2006/0146646 A1 | 7/2006 | Fanini et al. | |
| 2006/0192625 A1 | 8/2006 | Sorrells et al. | |
| 2008/0285379 A1 * | 11/2008 | Bishop et al. | 367/14 |

\* cited by examiner

*Primary Examiner* — Krystine Breier
(74) *Attorney, Agent, or Firm* — Edward Eugene Thigpen

(57) ABSTRACT

A system and method for deployment of a plurality of seismic recorder assemblies from a survey vessel on the ocean bottom is disclosed. The seismic recorder assemblies are self contained, autonomous nodal devices which are capable of receiving and recording reflected seismic energy and storing the data locally while operating for an extended period of time. The assemblies each have two or more attachment points for the connection of separate connecting cable segments.

20 Claims, 7 Drawing Sheets

SYSTEM AND METHOD FOR DEPLOYMENT OF SEISMIC DATA RECORDERS

BACKGROUND OF THE INVENTION

1. Field of the Invention

The invention relates generally to marine seismic surveying. More specifically, the invention relates to a system and method for deploying seismic recorders.

2. Description of the Related Art

Seismic exploration is widely used to survey subterranean geological formations to determine the location of hydrocarbon formations in the earth. Reflection seismology is used to estimate the properties of the subsurface from reflected seismic waves. In reflection seismology, generated acoustic waves are propagated down through subterranean strata and reflect from acoustic impedance differences at the interfaces between various subterranean strata. The reflected seismic energy is recorded and processed to create an image of the subsurface structures. Because many commercially viable hydrocarbon formations are located beneath bodies of water, marine seismic methods have been developed.

In marine seismic survey systems it is typical to use geophone, hydrophones, or other seismic recorders (also referred to as sensors) to detect reflected seismic energy that is emitted from one or more seismic sources. These recorders are generally deployed in an array that may constitute one or more parallel lines. There are numerous ways seismic recorders can be deployed in a marine environment. In some instances, a streamer carrying seismic recorder sensors is towed near the surface behind a survey vessel. The streamer typically contains wiring to interconnect the sensors. Examples of these types of systems are found in, for example, U.S. Pat. Nos. 4,450,543 and 5,561,640. Because the survey cable is, in most instances, of unitary design and contains the seismic recorders wired together within the cable, one cannot change the spacing between the seismic recorders within the cable as may be desirable given a specific geological objective of the survey at hand. Also, because the reflected acoustic energy propagates through the water before being received by the seismic recorders in the streamer, noise significantly distorts the reflected energy. Also, because water has no shear strength, the aforementioned method is only capable of recording the vertical or pressure component of the full seismic wavefield.

In other instances, interconnected seismic recorders are placed directly on the bottom in a method typically known as Ocean Bottom Cable, or simply "OBC." The seismic recorders in an OBC system are interconnected by reinforced cables that provide power and transmit data from the seismic recorders to a distal storage device. The rigid cables often allow good coupling with the bottom only along the major axis of the cable, significantly reducing the ability of the system, if equipped with three-dimensional geophones, to record the shear components of the full seismic wavefield. Additionally, one cannot readily change the spacing between the sensors within the cable as may be desirable given a specific geologic objective for a particular survey. Because this system relies on cables for power and telemetry, any damage to the cables or connectors, which is common in the marine environment, prevents the recording of data and contributes significant downtime and increased survey cost while the system is retrieved, repaired and redeployed. Also, the data and power cables contribute significant weight to the system which, combined with the reliability concerns, effectively prevents OBC systems from being deployed in deep water.

In other instances, autonomous nodal recorders are attached to a main cable by individual tethers, as disclosed in U.S. Pat. No. 6,024,344 to Buckley et al. The tethers interconnect a single attachment point on the recorder to a single attachment point on the cable. There are significant drawbacks with this type of arrangement. It is often necessary to remove the recorders from the main cable when the units are retrieved for charging, downloading and moving and then reattach the recorders immediately prior to re-deployment, which increase the handling effort and cost and also complicate the task of ensuring that the individual seismic recorders are deployed in the desired sequence. There is also a risk that the tethers could wrap around and get tangled in the main cable during deployment and potentially compromise data quality. If the main cable consists of a single length of cable and is damaged, the entire cable may have to be replaced at a significant financial cost and delay of operations. If the seismic recorders attach to the main cable at fixed attachment points, it is difficult to adjust the spacing between recorders, as may be necessary given the objective of a particular survey. Also, because the seismic recorders attach to the main cable only at a single point, the recorders will land on the ocean bottom at a completely random orientation relative to the other recorders and the survey geometry in general.

SUMMARY OF THE INVENTION

In one embodiment, the invention is directed to a system and method for deploying a plurality of seismic recorder assemblies from a survey vessel on the ocean bottom. The seismic recorder assemblies are self contained, autonomous nodal devices which are capable of receiving and recording reflected seismic energy and storing the data locally while operating for an extended period of time. The assemblies each have two or more attachment points for the connection of separate connecting cable segments.

In one embodiment, a seismic recorder array is configured to be deployed on the bottom of a body of water. The array includes a plurality of autonomous seismic recorders interconnected by separate connecting segments (also referred to as cable segments). The connecting segments or cable segments are not attached to one another. Adjacent pairs of recorders are connected by a respective connecting segment. The maximum distance between the adjacent recorders is established by the length of the respective connecting segment. When the seismic recorder array is fully stretched or is under tension, the distance between the adjacent recorders will be greatest, which is equal to the length of the connecting segment that connects the adjacent recorders.

In one embodiment, a method of deploying a seismic recorder array on the bottom of a body of water includes affixing a first connecting segment to a first attachment point on a first recorder and affixing the first connecting segment to a first attachment point on a second recorder. The method further includes affixing a second connecting segment to a second attachment point on the second recorder, and disposing the recorders into the body of water.

BRIEF DESCRIPTION OF THE DRAWINGS

For detailed understanding of the invention, reference is made to the following detailed description of the preferred embodiments, taken in conjunction with the accompanying drawings in which reference characters designate like or similar elements throughout the several figures of the drawings.

DETAILED DESCRIPTION OF THE EMBODIMENTS

Figure 1:
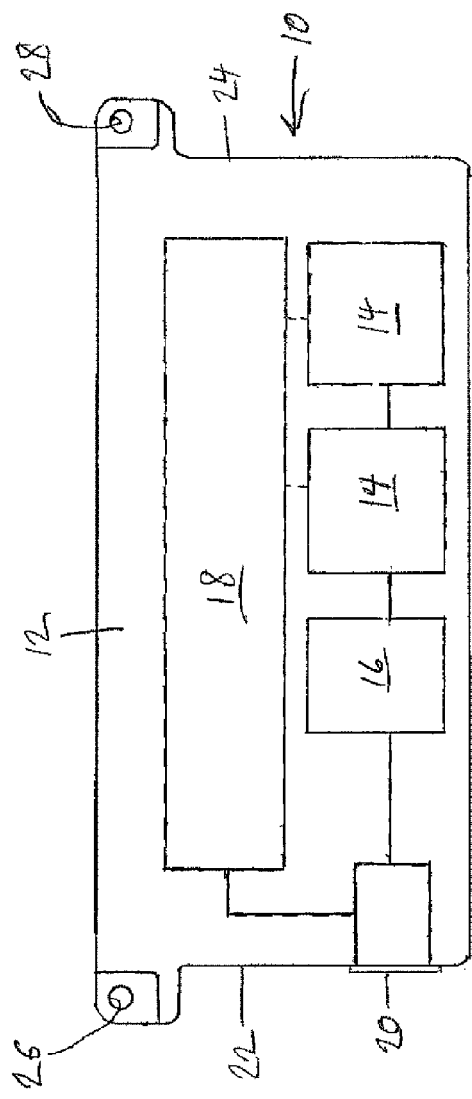
FIG. 1 is a side view of an exemplary seismic recorder assembly for use with the present invention.
Figure 2:
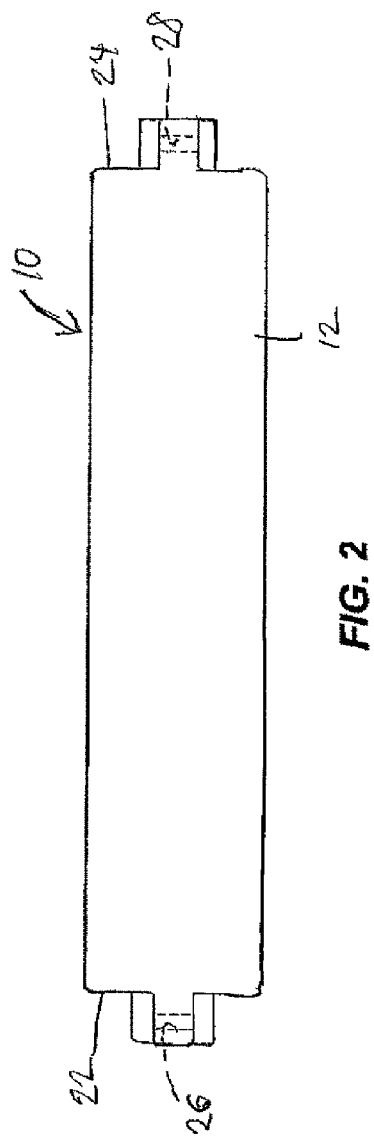
FIG. 2 is a top view of the seismic recorder assembly shown in FIG. 1.
Figure 3:
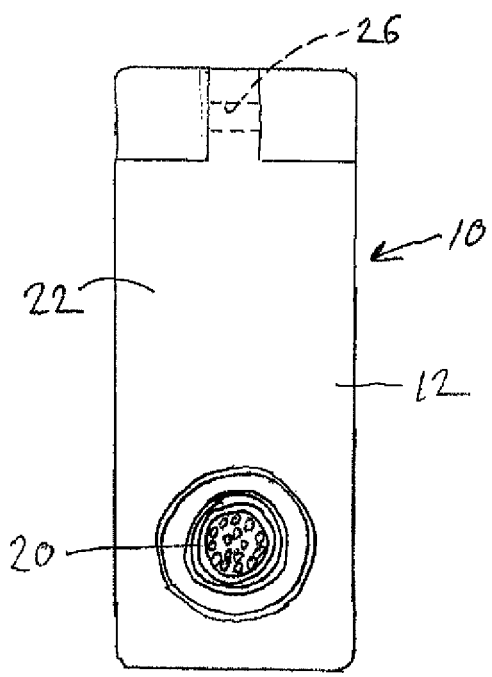
FIG. 3 is an end view of the seismic recorder assembly shown in FIGS. 1 and 2.

FIGS. 1-3 depict an exemplary seismic recorder assembly, or recorder assembly, 10 in accordance with one embodiment. The recorder assembly 10 generally includes an outer housing 12. The housing 12 contains one or more seismic energy sensors 14 capable of sensing reflected seismic energy. The seismic energy sensors 14 are preferably geophones, hydrophones or other sensor devices known in the art. The sensors 14 are electrically connected to a circuit 16. The circuit 16 may include one or more programmable processors of a type known in the art for controlling operation of the sensors 14 and a data storage device for recording the received seismic waves. The circuit 16 may also include a clock configured to provide timing signals to the sensors and provide time stamp to the recorded seismic waves. Exemplary seismic sensors, storage devices and a clock circuit for use in this application are described in further detail in U.S. Patent Publication No. 2008/0049550, entitled "Autonomous Seismic Data Acquisition Unit," which is hereby incorporated by reference in its entirety.

The housing 12 also encloses a power source 18, which is electrically connected to the sensors 14 and the circuit 16 to provide power for those components. The power source 18 is preferably a rechargeable battery which is sufficient to power the components within the housing 12 for the required duration of time. In one implementation, the seismic recorder assembly 10 is a self-contained, autonomous, nodal recorder assembly which is capable of detecting and recording seismic energy without the need for an external power or data cable to be connected to it during use. A data and power cable plug 20 is incorporated into the housing 12 and is interconnected with the power source 18 as well as the data storage device. A charging and downloading cable (not shown) can be coupled to the data and power plug 20 when the recorder assembly 10 is aboard the survey vessel and not in use, in order to recharge the power source 18 and/or retrieve recorded seismic data from the data storage medium. The individual components 14, 16, 18, and 20 contained within the housing 12 are preferably sealed and water-tight as well as pressure-resistant to withstand the water pressures associated with deep marine environments. These components can be sealed together, in groups or individually. Preferably, the housing 12 can serve to create the sealed and pressure-resistant environment for the internal components.

The housing 12 is depicted as having a generally rectangular body with generally opposite end portions 22 and 24. The housing 12 may be cylindrical, spherical, tubular, conical, or have any other suitable shapes. In addition, the housing 12 may be symmetrical or non-symmetrical. In one implementation, the end portions 22, 24 are located at generally opposite ends of the housing 12. First and second attachment points 26, 28 are formed on the housing 12 proximate to the respective end portions 22, 24. The attachment points 26, 28 are shaped and sized to be suitable for the reversible attachment of connecting segments, as will be described. In the depicted embodiment, the attachment points 26, 28 are apertures through which a snap link may be disposed.

Figure 4:
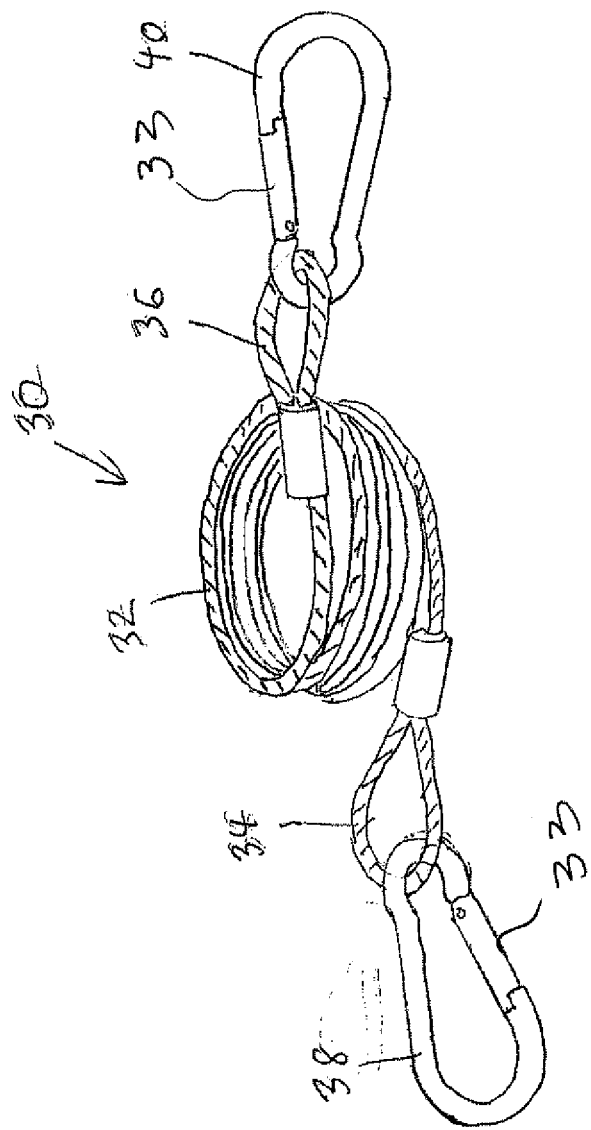
FIG. 4 is an isometric view of an exemplary connecting segment used to interconnect two seismic recorder assemblies.

FIG. 4 depicts an exemplary connecting segment 30 which is used to interconnect two recorders 10. In the depicted embodiment, the connecting segment 30 includes a non-metallic rope segment 32 with two end loops 34, 36. It should be understood that, while the segment 32 material is shown in the form of a non-metallic rope, it may also take the form of a metallic cable, coated cable, chain, or similar element. In addition, the connecting segment 30 may be of any desired length. Typically, the connecting segments 30 are of the same length, but their lengths may differ. The connecting segment 30 also includes two swivels 33 and two snap links 38, 40 of a type known in the art to facilitate attachment of the cable segment 32 to the seismic recorder assemblies 10.

Figure 5:
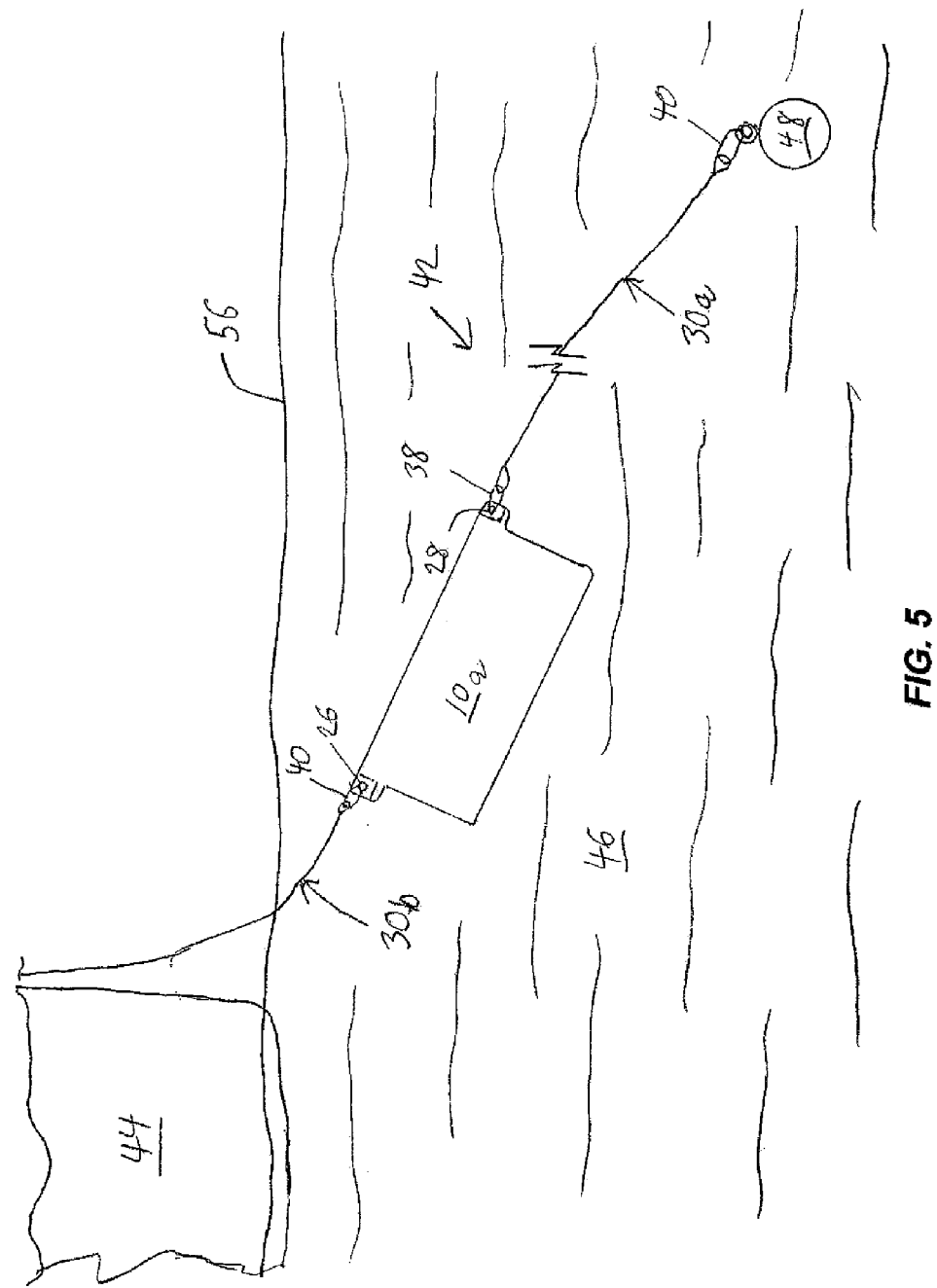
FIG. 5 is a side view of an exemplary recorder array, in accordance with the present invention, during deployment.

FIG. 5 illustrates a recorder array 42 in accordance with one embodiment during deployment into ocean 46 from a survey vessel 44. The term "ocean," as used herein, is intended to refer generally to all navigable bodies of water, including freshwater lakes and rivers as well as seas. An anchor 48 is affixed to a first connecting segment 30a. The anchor 48 could take the form of an anchor, chain or other suitable weighted object. A first recorder assembly 10a is affixed to the first connecting segment 30a and a second connecting segment 30b. A second recorder assembly 10b (not shown) is interconnected to the first recorder assembly 10a via the second connecting segment 30b. The second connecting segment 30b is separate from and not attached to the first connecting segment 30a. It is noted that the use of the anchor 48 is optional. To attach the first recorder assembly 10a to the anchor 48, the snap link 38 of the first connecting segment 30a is connected to attachment point 28 on the first recorder assembly 10a, and the other snap link 40 is affixed to the anchor 48. In an alternative embodiment of the invention, the first recorder assembly 10a is deployed into the ocean 46 without an anchor 48 attached to the first attachment point 28 via a first connecting segment 30a.

The greatest or maximum distance between adjacent recorder assemblies is established by the length of the connecting segment that connects the adjacent recorder assemblies. Thus, the greatest or maximum distance between the recorder assemblies 10a and 10b is established by the length of the connecting segment 30b. It will be apparent that when the recorder array is fully stretched or under tension, the distance between the adjacent recorder assemblies 10a and 10b will be greatest, which is established by the length of the connecting segment 30b.

Figure 6:
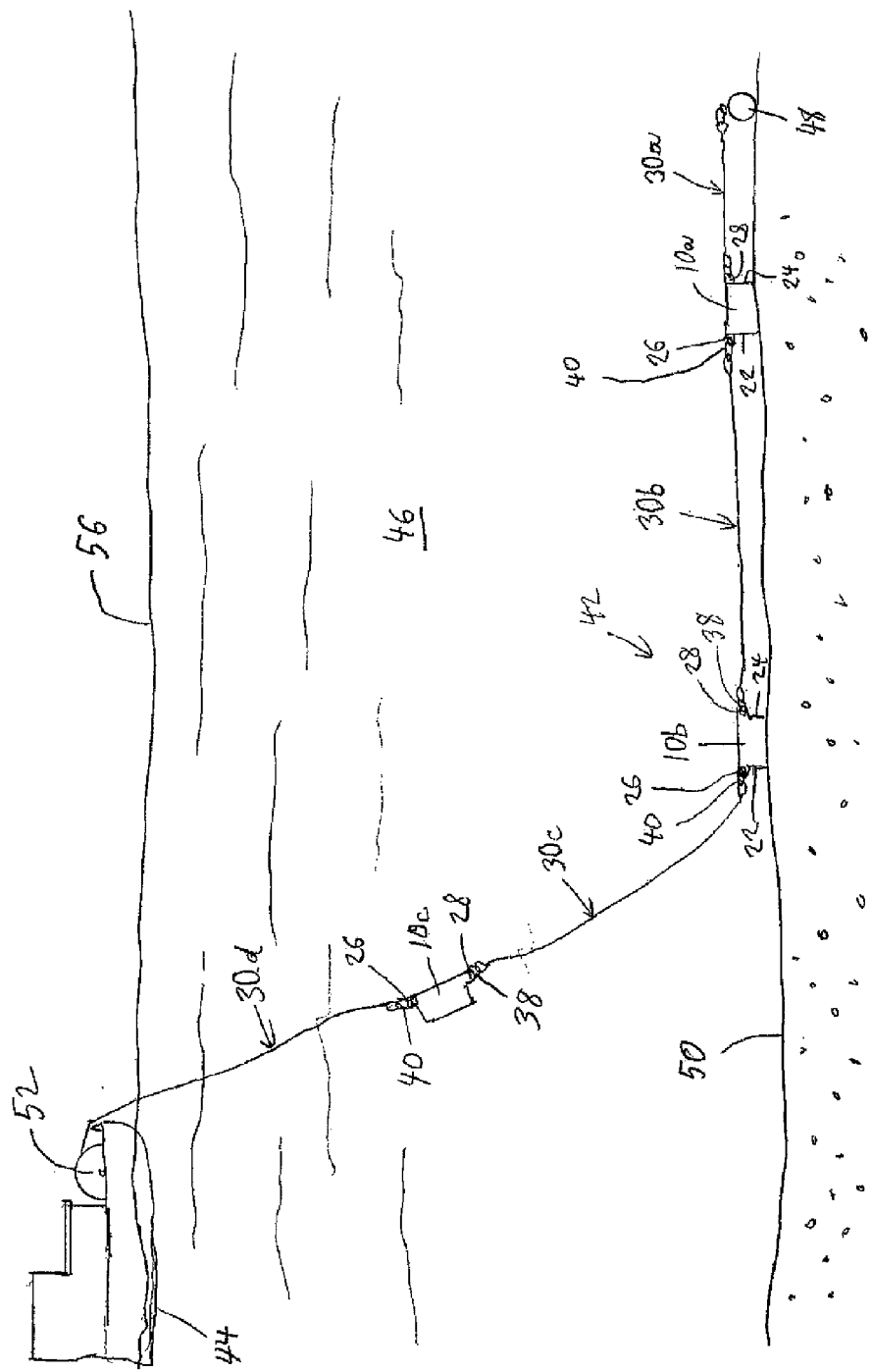
FIG. 6 is a side view of the recorder array shown in FIG. 5, now at a further point during deployment.

FIG. 6 depicts the exemplary recorder array 42 now in a further point during deployment. Three recorders 10a, 10b and 10c have now been assembled with connecting segments 30b and 30c interconnecting them. It should be understood that the recorder array 42 is preferably assembled by securing the snap link 40 of connecting segment 30b to one attachment point 26 of the first recorder assembly 10a and the other snap link 38 of the connecting segment 30b to one attachment point 28 on the second recorder assembly 10b. Then, the third recorder assembly 10c is interconnected to the second recorder assembly 10b by attaching one snap link 40 of the connecting segment 30c to attachment point 26 on the second recorder assembly 10*b* and the other snap link 38 of the connecting segment 30*c* to the attachment point 28 of the third recorder assembly 10*c*. The snap link 40 of the next connecting segment 30*d* is then attached to the connecting point 26 of the third recorder assembly 10*c*.

As the components are assembled, they can be placed into the water 46 from the vessel 44 generally in the order in which they are assembled or the components can be pre-assembled in advance of deployment. The anchor 48 and connecting segment 30*a* are placed into the water 46 and allowed to sink toward the sea floor or bottom 50. Thereafter as the survey vessel moves along the planned path of the recorder array, the first recorder assembly 10*a* and connecting segment 30*b* are placed into the water 46 and allowed to sink toward the sea floor 50. This is repeated with the second recorder assembly 10*b* and second connecting segment 30*c* and so on. During deployment, the vessel 44 is preferably moving in a line above the area where it is desired to place the recorder array 42. The speed of the survey vessel 44 and the points at which the recorder assemblies 10 and connecting segments 30 are placed in the water are set to facilitate the units landing on the bottom 50 at a desired position and interval.

Figure 7:
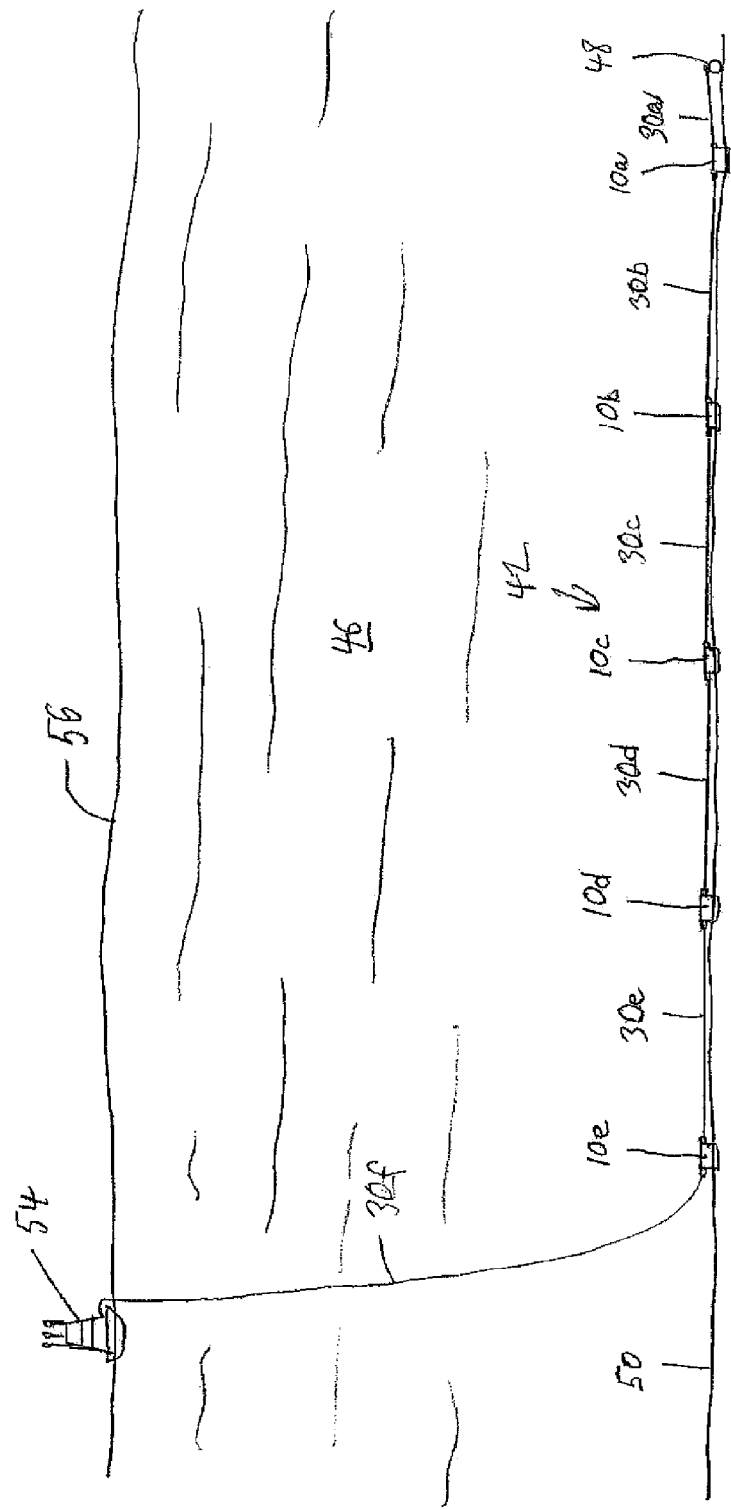
FIG. 7 is a side view of the recorder array shown in FIGS. 5 and 6, now fully deployed.

FIG. 7 illustrates the recorder array 42 now in a fully deployed configuration. Recorder assemblies 10*a*, 10*b*, 10*c*, 10*d*, and 10*e* are deployed along the ocean bottom 50. When the desired number of recorder assemblies 10 is deployed into the water 46, the array 42 is preferably terminated with a floatable marker 54. The marker 54 may be a floating buoy or a known device that rests on the ocean bottom 50 and then is inflated upon receipt of a remote trigger signal so that it rises to the surface 56 of the water 46. A marker connecting segment 30*f* is used to interconnect the marker 54 with the last recorder assembly 10*e*. One or more markers might also be attached to other connecting segments 30 or recorders 10.

Although only five recorder assemblies 10 are depicted, those of skill in the art will understand that the array 42 may include many more recorder assemblies 10 which are interconnected to each other in the same manner as these. It is noted that the recorder array 42 is preferably disposed in a substantially linear configuration along the ocean bottom 50.

In order to retrieve the recorder array 42 into the survey vessel 44, the marker 54 is retrieved into the vessel 44 along with the connecting segment 30*f*. Thereafter, the recorders 10 and connecting segments 30 are retrieved into the vessel 44 in the reverse order from which they were deployed. Finally, the anchor 48 is retrieved into the vessel 44. Preferably, a winch 52 or similar device is used to help draw the components into the vessel 44.

Figure 8:
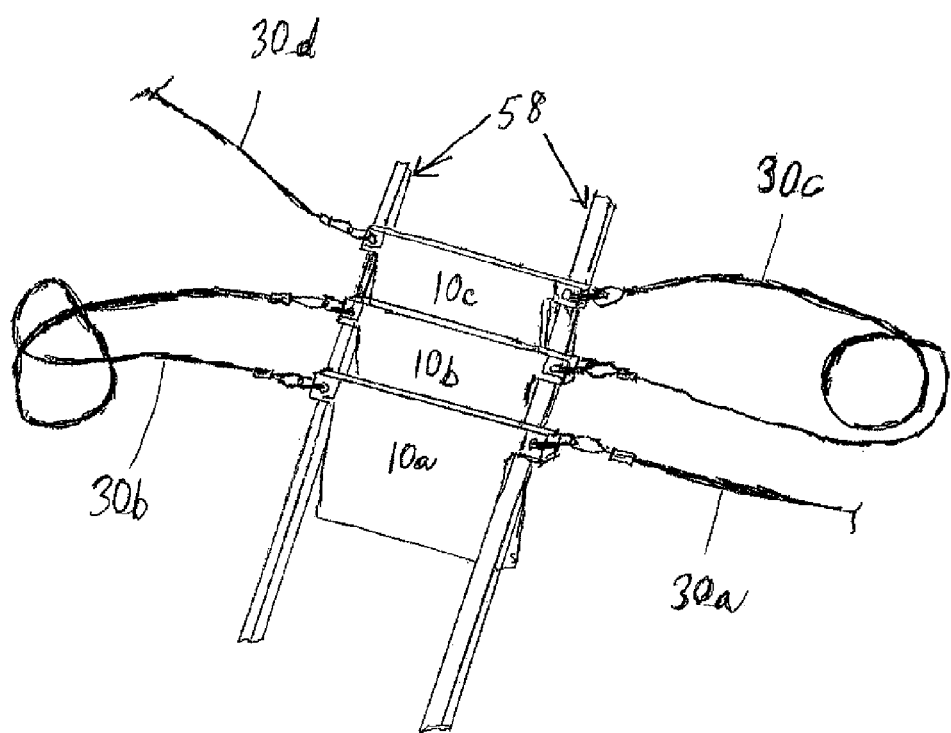
FIG. 8 illustrates a technique for storing a recorder array constructed in accordance with the present invention.

Once the recorder array 42 has been retrieved, the receiver array 42 is generally left intact and stored on the survey vessel 44 as a single unit awaiting redeployment in another location. In an alternate embodiment of the invention, the recorder array 42 may be disassembled into its major components, the recorder assemblies 10 and the connecting segments 30, as it is retrieved onto the survey vessel 44. If this is done, the various connecting segments 30 may be secured to one another in an end-to-end fashion to form a single continuous strand. This strand may then be coiled up or wound onto a reel. FIG. 8 illustrates an exemplary storage rack 58 upon which the recorder array 42 might be stored. As illustrated, recorder assemblies 10*a*, 10*b* and 10*c* are stored upon the rack 58.

Those of skill in the art will recognize that numerous modifications and changes may be made to the exemplary designs and embodiments described herein and that the invention is limited only by the claims that follow and any equivalents thereof.

What is claimed is:

1. A seismic data recorder array configured to be deployed on a bottom of a body of water, the seismic data recorder array comprising a plurality of individually powered autonomous seismic data recorders reversibly interconnected by separate mechanical connecting segments, each adjacent pair of seismic data recorders being reversibly connected by a corresponding mechanical connecting segment, each such mechanical connecting segment containing no electrical or optical communication means or electrical or optical conductors, and wherein adjacent connecting segments are not attached to one another and the seismic data recorders are configured not to communicate with one another when deployed in the array on the bottom of the body of water.

2. The seismic data recorder array of claim 1, wherein a maximum distance between adjacent seismic data recorders is established by a length of the respective connecting segment.

3. The seismic data recorder array of claim 1, wherein each seismic data recorder is reversibly connected to two separate and detached connecting segments, each segment being configured to connect to an adjacent seismic data recorder.

4. The seismic data recorder array of claim 1, wherein each of the seismic data recorders comprises a housing having at least two attachment points for reversible attachment to the connecting segment.

5. The seismic data recorder array of claim 1, wherein each of the seismic data recorders comprises a housing having at least two separate and spaced apart attachment points for reversible attachment to the connecting segments.

6. The seismic data recorder array of claim 1, wherein each seismic data recorder has a housing with first and second generally opposite end portions, the housing having a first connecting segment attachment point located on the first end portion and a second connecting segment attachment point located on the second end portion.

7. The seismic data recorder array of claim 1, wherein each of the seismic data recorders further comprises:
a housing having at least two separate and spaced apart attachment points for reversible attachment to the connecting segments;
at least one receiver enclosed in the housing for receiving seismic signals; and
a power source enclosed in the housing for providing electrical power to the receiver.

8. The seismic data recorder array of claim 7, further comprising:
a processor configured to control the operation of the receiver; and
a memory device coupled to the receiver and configured to record the seismic signals.

9. The seismic data recorder array of claim 1, further comprising an anchor interconnected to one of the recorders.

10. The seismic data recorder array of claim 1, further comprising a floatable marker connected to at least one of the recorders.

11. The seismic data recorder array of claim 1, wherein the connecting segment comprises a metallic cable or chain.

12. The seismic data recorder array of claim 1, wherein the connecting segment comprises a non-metallic rope.

13. A seismic data recorder array configured to be deployed on the bottom of a body of water, the seismic data recorder array comprising a plurality of individually powered autonomous seismic data recorders reversibly interconnected by separate mechanical connecting segments, each adjacent pair of seismic data recorders being reversibly connected by a corresponding mechanical connecting segment, each such mechanical connecting segment containing no electrical or optical communication means or electrical or optical conductors, wherein adjacent connecting segments are not attached to one another and each of the autonomous seismic data recorders comprises a housing including at least two separate and spaced apart attachment points for attachment to the connecting segments corresponding thereto.

14. The seismic data recorder array of claim 13, wherein each housing includes first and second generally opposite end portions, each housing having a first connecting segment attachment point located on the first end portion and a second connecting segment attachment point located on the second end portion.

15. The seismic data recorder array of claim 13, wherein each autonomous seismic data recorder further comprises:
   at least one receiver enclosed in the housing for receiving seismic signals; and
   a power source enclosed in the housing for providing electrical power to the receiver.

16. The seismic data recorder array of claim 13, wherein each autonomous seismic data recorder further comprises:
   a processor configured to control the operation of the receiver; and
   a memory device coupled to the receiver and configured to record the seismic signals.

17. The seismic data recorder array of claim 13, further comprising an anchor interconnected to at least one of the seismic data recorders.

18. A method of deploying a seismic data recorder array on the bottom of a body of water, the seismic data recorder array comprising a plurality of autonomous individually powered seismic data recorders, each seismic data recorder having at least two connecting segment attachment points corresponding thereto, each pair of adjacent seismic data recorders being reversibly interconnected by a mechanical connecting segment containing no electrical or optical conductors, adjacent connecting segments not being attached to one another, the method comprising:
   reversibly affixing a first connecting segment to a first attachment point on a first seismic data recorder;
   reversibly affixing the first connecting segment to a first attachment point on a second seismic data recorder;
   reversibly affixing a second connecting segment to a second attachment point on the second seismic data recorder, and
   deploying the recorders into the body of water;
   wherein the seismic data recorders are not configured to communicate the one another when deployed in the array on the bottom of the body of water.

19. The method of claim 18, wherein the first and second seismic data recorders each have a housing having generally opposite first and second end portions and wherein;
   the first attachment point of each seismic data recorder is located on the first end portion of that seismic data recorder; and
   the second attachment point of each seismic data recorder is located on the second end portion of that seismic data recorder.

20. The method of claim 18, further comprising interconnecting a floatable maker with at least one seismic data recorder.

* * * * *